United States Patent
Imandi

(10) Patent No.: US 12,255,568 B2
(45) Date of Patent: Mar. 18, 2025

(54) MONITORING CIRCUIT FOR ELECTRICAL MOTOR SPACE HEATERS

(71) Applicant: SAUDI ARABIAN OIL COMPANY, Dhahran (SA)

(72) Inventor: Lakshmi Srinivas Imandi, Ras Tanura (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 280 days.

(21) Appl. No.: 17/823,447

(22) Filed: Aug. 30, 2022

(65) Prior Publication Data

US 2024/0072716 A1   Feb. 29, 2024

(51) Int. Cl.
*H02P 29/62* (2016.01)
*H02K 11/25* (2016.01)

(52) U.S. Cl.
CPC .............. *H02P 29/62* (2016.02); *H02K 11/25* (2016.01)

(58) Field of Classification Search
CPC ................................. H02P 29/62; H02P 11/25
USPC ........................................................ 310/68 C
See application file for complete search history.

(56) References Cited

FOREIGN PATENT DOCUMENTS

| CN | 202694066 U | * | 1/2013 |
| CN | 206977280 U | * | 2/2018 |
| CN | 215419576 U |   | 1/2022 |
| JP | 2004088924 A | * | 3/2004 |

OTHER PUBLICATIONS

JP-2004088924-A (Kabela et al.) (Mar. 18, 2004) (Machine Translation) (Year: 2004).*

* cited by examiner

*Primary Examiner* — Mahmoud Gimie
(74) *Attorney, Agent, or Firm* — Vorys, Sater, Seymour and Pease LLP

(57) ABSTRACT

The present disclosure relates to systems and/or methods for monitoring one or more motor space heaters. For example, various embodiments described herein can relate to a method for monitoring one or more motor space heaters that includes detecting that an electric motor is inactive based on operation data generated by a sensor circuit coupled to the electric motor. Additionally, the method can include determining, in response to the detecting, whether a motor space heater in proximity to the electric motor is active based on the operation data. Also, the sensory circuit can be further coupled to the motor space heater.

15 Claims, 4 Drawing Sheets

MONITORING CIRCUIT FOR ELECTRICAL MOTOR SPACE HEATERS

FIELD OF THE DISCLOSURE

The present disclosure relates generally to monitoring a motor space heater and, more particularly, to detecting one or more malfunctions in the operating status and/or functionality of the motor space heater based on operation data collected by a sensor circuit coupled to the motor space heater and an associate electric motor.

BACKGROUND OF THE DISCLOSURE

Motor space heaters are typically used to keep the temperature of a motor above the ambient dew point while the motor is turned off. For example, the motor space heaters can mitigate the accumulation of condensation on the motor by heating the motor during times of inactivity. With regards to electric motors, condensation build-up is known to cause premature failure by damaging motor components, such as electrical connections.

The motor space heaters can be positioned within an enclosure that houses the motor (e.g., a terminal box and/or the like), and can utilize various types of heating elements (e.g., single or multiple heating elements arranged in a series or parallel configuration) to raise the temperature of the motor during inactivity. Operation of the motor space heaters is typically controlled by a motor starter auxiliary contact. The motor space heaters can be manually monitored by visually inspecting ammeters coupled to the auxiliary contact (e.g., the ammeters can be mounted to a motor starter cabinet or switchgear).

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method is provided. The method can comprise detecting that an electric motor is inactive based on operation data generated by a sensor circuit coupled to the electric motor. The method can also comprise determining, in response to the detecting, whether a motor space heater in proximity to the electric motor is active based on the operation data. In various embodiments, the sensor circuit is further coupled to the motor space heater.

In another embodiment, a system is provided. The system can comprise a sensor circuit coupled to an electric motor and a motor space heater. The sensor circuit can generate operation data characterizing the operating status of the electric motor. The system can also comprise a data evaluator configured to monitor the operation data to determine whether the motor space heater is active in response to the operation data indicating that the electric motor is inactive.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
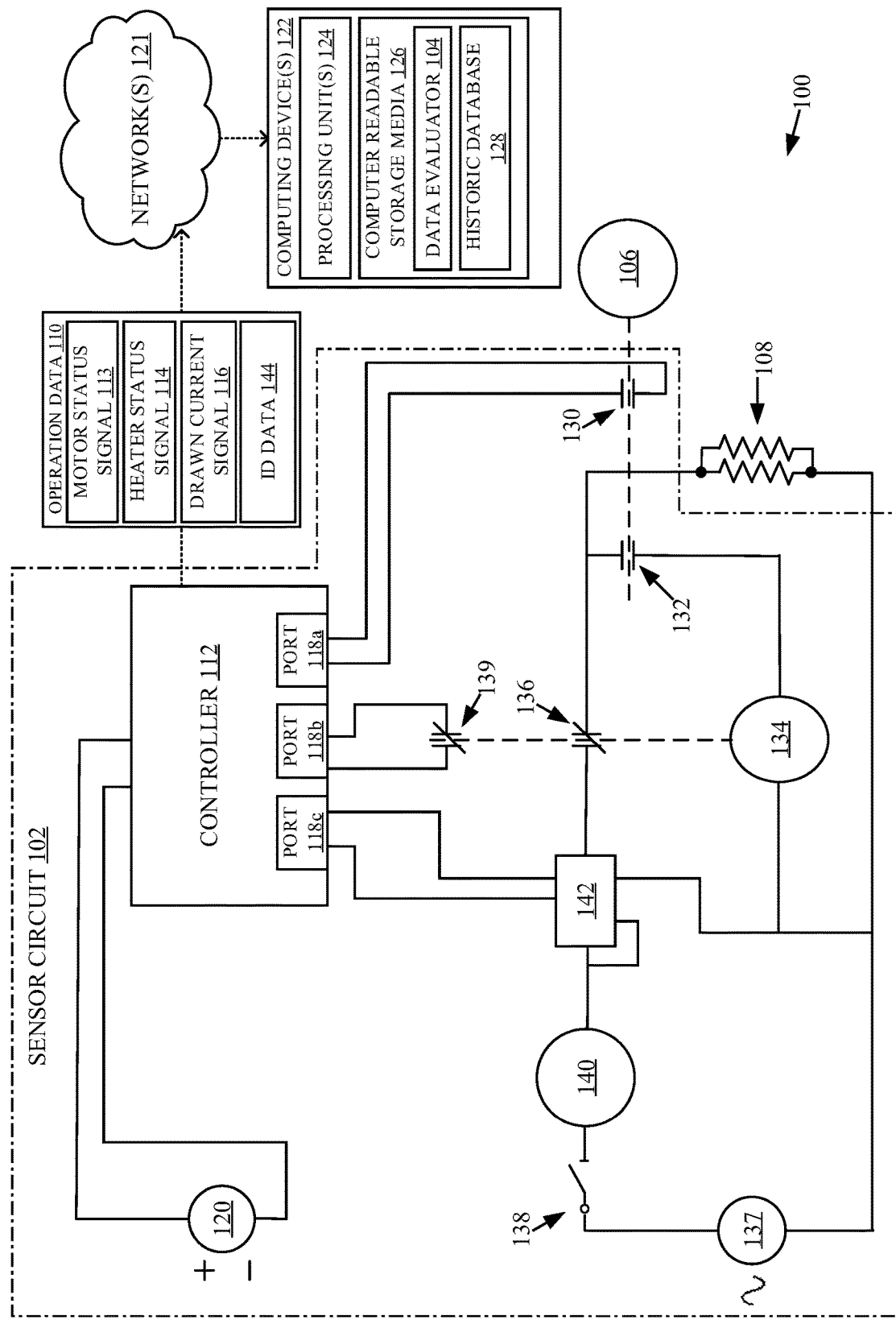
FIG. 1 is a diagram of a non-limiting example system that can comprise one or more sensor circuits and/or data evaluators for monitoring the operating status and/or functionality of one or more motor space heaters in accordance with one or more embodiments described herein.

Embodiments of the present disclosure will now be described in detail with reference to the accompanying figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Typically, operation failures of a motor space heater are detected by manually monitoring the current of an ammeter coupled to the motor space heater. For instance, the ammeter can be inspected as part of a regularly occurring maintenance routine. However, partial operation failures are undetectable via an ammeter inspection and are conventionally detected only during motor maintenance checks that measure electrical resistance in the circuitry of the motor space heater.

Partial or complete operation failures of the motor space heater can lead to corrosion of the motor components within the housing due to, for example, the condensation of humid air. Further, the accumulation of moisture within the motor housing (e.g., due to condensation) can diminish the operating life and/or efficiency of the motor. For instance, the moisture can result in electrical faults within an electrical motor's stator and rotator winding, caused by a reduction of insulation resistance and/or partial discharges. In another instance, the moisture can result in mechanical damage to the windings of electrical motors, caused by rotating mechanical parts (e.g., connectors, rotor holding bolts, and/or the like) that have been disengaged while in operation due to stress corrosion cracking. The longer the motor space heater is malfunctioning, the greater the likelihood of damage to the motor and/or its components.

Embodiments in accordance with the present disclosure generally relate to systems and/or computer-implemented methods for remote monitoring motor space heaters. For example, the motor space heaters can be employed to protect the longevity of electrical motors (e.g., gas compression motors) used in a variety of outdoor atmospheres, where condensation build-up can be prevalent. Advantageously, one or more embodiments described herein can monitor (e.g., in a continuous, near continuous, and/or scheduled manner) one or more motor space heaters via: a sensor circuit that can collect operation data; and a data evaluator that can generate notifications regarding the operating status and/or functionality of the one or more motor space heaters.

For example, the sensor circuit can measure and/or collect operation data indicative of the operating status and/or functionality of the one or more motor space heaters. Further, the sensor circuit can share the operation data with one or more data evaluators, which can be remote to the sensor circuit and/or motor space heaters. The one or more data evaluators can analyze the operation data to detect when the motor space heater is malfunctioning, or deviating from standard functionality, and can generate one or more notifications. For example, malfunctions can be detected based on operation data indicative of changes to preset levels of drawn current and/or the status of an associated electric motor. For instance, the data evaluator can detect a malfunction in the operating status of the one or more motor space heaters based on the one or more motor space heaters being inactive while the one or more electric motors are also inactive. In another instance, the data evaluator can detect a malfunction in the functionality of the one or more motor space heaters based on the one or more motor space heaters drawing a level of current that is non-compliant with one or more predefined threshold values that characterize proper functionality of the one or more motor space heaters.

Further, one or more embodiments described herein can constitute one or more technical improvements over conventional monitoring of motor space heaters by enabling a remote monitoring scheme that can autonomously monitor motor space heaters on a continuous, or near continuous basis. For instance, various embodiments described herein can detect malfunctions regarding the operating status and/or functionality (e.g., can detect complete or partial failures) of the motor space heaters. Additionally, one or more embodiments described herein can have a practical application by enabling the remote and/or continuous monitoring of the motor space heaters. Moreover, various embodiments described herein can enable the simultaneous monitoring of multiple motor space heaters, despite the motor space heaters being positioned a great distance away from each other.

FIG. 1 illustrates a diagram of a non-limiting example monitoring system 100 that can include a sensor circuit 102 operably coupled to a data evaluator 104 in accordance with one or more embodiments described herein. The sensor circuit 102 can be connected to one or more electric motors 106 and/or motor space heaters 108. In various embodiments, the sensor circuit 102 can continuously monitor the functionality of the one or more electric motors 106 and/or motor space heaters 108 to generate operation data 110. In one or more embodiments, the operation data 110 can comprise a motor status signal 113, a heater status signal 114, and/or a drawn current signal 116. The motor status signal 113 can be indicative of an operating status (e.g., an ON or OFF condition) of the one or more electric motors 106. The heater status signal 114 can be indicative of an operating status (e.g., an ON or OFF condition) of the one or more motor space heaters 108. The drawn current signal 116 can be indicative of the electrical current being drawn by the one or more motor space heaters 108.

The one or more electric motors 106 can be one or more electrical machines that can convert electrical energy into mechanical energy. Example types of electric motors can include, but are not limited to: direct current ("DC") motors (e.g., DC shunt motors, separately excited motors, DC series motors, permanent magnet DC motors, and/or DC compound motors), alternating current ("AC") motors (e.g., synchronous motors and/or induction motors), and/or special purpose motors (e.g., stepper motors, brushless motors, hysteresis motors, reluctance motors, and/or universal motors). Additionally, the one or more electric motors 106 can be comprised within a wide variety of devices for numerous applications, including, but not limited to: gas compression motors, crude oil/water/liquid chemical pumping motors, air compression motors, a combination thereof, and/or the like.

The one or more motor space heaters 108 can be one or more electrical machines that can convert electrical energy into heat energy. For example, the one or more motor space heaters 108 can control a variety of heating elements, including, but not limited to: resistance wire heating elements, ceramic and semiconductor heating elements, thick film heating elements, polymer heating elements, composite heating elements, a combination thereof, and/or the like. In some embodiments, the one or more motor space heaters 108 can include one or more heating devices capable of reaching temperatures ranging from, for example, greater than or equal to 50 degrees centigrade and less than or equal to 200 degrees centigrade and/or maximum allowed electric motor 106 surface temperature. In various embodiments, the one or more motor space heaters 108 can be positioned in proximity to the one or more electric motors 106 and/or can raise the ambient temperature when the one or more electric motors 106 are inactive.

As shown in FIG. 1, the sensor circuit 102 can include one or more controllers 112 (e.g., intelligent motor protection and/or monitoring relays, programmable logic controllers ("PLCs"), and/or other controllers generally used with motor circuits, which can generate the operation data 110 based on electrical input signals to a first port 118*a*, a second port 118*b*, and/or a third port 118*c*. The electrical input signals can be analog or digital inputs. Further, the one or more controllers 112 can be powered by one or more DC sources 120 (e.g., as exemplified in FIG. 1). In various embodiments, the controller 112 can be operably coupled to, and/or transmit the operation data 110 to, the data evaluator 104 via one or more networks 121.

The one or more networks 121 can comprise one or more wired and/or wireless networks, including, but not limited to: a cellular network, a wide area network ("WAN"), a local area network ("LAN"), a combination thereof, and/or the like. One or more wireless technologies that can be comprised within the one or more networks 121 can include, but are not limited to: wireless fidelity ("Wi-Fi"), a WiMAX network, a wireless LAN ("WLAN") network, BLUETOOTH® technology, a combination thereof, and/or the like. For instance, the one or more networks 121 can include the Internet and/or the Internet of Things ("IoT"). In various embodiments, the one or more networks 121 can comprise one or more transmission lines (e.g., copper, optical, or wireless transmission lines), routers, gateway computers, and/or servers. Further, the one or more computing devices 122 and/or controllers 112 can comprise one or more network adapters and/or interfaces (not shown) to facilitate communications via the one or more networks 121.

In one or more embodiments, the data evaluator 104 can be comprised within one or more computing devices 122 (e.g., a server, a desktop computer, a laptop, a hand-held computer, a programmable apparatus, a minicomputer, a mainframe computer, an Internet of things ("IoT") device, and/or the like). The one or more computing devices 122 can further comprise one or more processing units 124 and/or computer readable storage media 126. In various embodiments, the computer readable storage media 126 can store one or more computer executable instructions that can be executed by the one or more processing units 124 to perform one or more defined functions. In various embodiments, the data evaluator 104 can be computer executable instructions and/or can be hardware components operably coupled to the one or more processing units 124. For instance, in one or more embodiments, the one or more processing units 124 can execute the data evaluator 104 to perform various functions described herein (e.g., such as detecting partial or full failure of the one or more motor space heaters 108). Additionally, the computer readable storage media 126 can store the operation data 110. For example, the operation data 110 can be stored as a part of a historic database 128 that records the operating history of the one or more motor space heaters 108.

The one or more processing units 124 can comprise any commercially available processor. For example, the one or more processing units 124 can be a general purpose processor, an application-specific system processor ("ASSIP"), an application-specific instruction set processor ("ASIPs"), or a multiprocessor. For instance, the one or more processing units 124 can comprise a microcontroller, microprocessor, a central processing unit, and/or an embedded processor. In one or more embodiments, the one or more processing units 124 can include electronic circuitry, such as: programmable logic circuitry, field-programmable gate arrays ("FPGA"), programmable logic arrays ("PLA"), an integrated circuit ("IC"), and/or the like.

The one or more computer readable storage media 126 can include, but are not limited to: an electronic storage device, a magnetic storage device, an optical storage device, an electromagnetic storage device, a semiconductor storage device, a combination thereof, and/or the like. For example, the one or more computer readable storage media 126 can comprise: a portable computer diskette, a hard disk, a random access memory ("RAM") unit, a read-only memory ("ROM") unit, an erasable programmable read-only memory ("EPROM") unit, a CD-ROM, a DVD, Blu-ray disc, a memory stick, a combination thereof, and/or the like. The computer readable storage media 126 can employ transitory or non-transitory signals. In one or more embodiments, the computer readable storage media 126 can be tangible and/or non-transitory. In various embodiments, the one or more computer readable storage media 126 can store the one or more computer executable instructions and/or one or more other software applications, such as: a basic input/output system ("BIOS"), an operating system, program modules, executable packages of software, and/or the like.

The one or more data evaluators 104 can be program instructions for carrying out one or more operations described herein. For example, the one or more data evaluators 104 can be, but are not limited to: assembler instructions, instruction-set architecture ("ISA") instructions, machine instructions, machine dependent instructions, microcode, firmware instructions, state-setting data, configuration data, source code, object code, a combination thereof, and/or the like. For instance, the data evaluator 104 can be written in one or more procedural programming languages. Although FIG. 1 depicts the data evaluator 104 stored on computer readable storage media 126, the architecture of the system 100 is not so limited. For example, the data evaluator 104 can be embedded in the one or more processing units 124. In one or more embodiments, the data evaluator 104 can comprise logic circuitry for implementing one or more logic functions described herein.

FIG. 1 depicts an exemplary embodiment in which the one or more data evaluators 104 are remotely located from the sensor circuit 102 and/or the controller 112; however, the architecture of the system 100 is not so limited. For example, embodiments in which the data evaluator 104 is coupled to the controller 112 via a direct electrical connection are also envisaged. For instance, the data evaluator 104 can optionally be comprised within the sensor circuit 102.

As shown in FIG. 1, the one or more controllers 112 can be connected to the one or more electric motors 106 and/or motor space heaters 108 via one or more electrical connections (e.g., copper wiring) utilizing one or more electrical contacts, relays, switches, and/or transducers. For example, the first port 118a can be coupled to the one or more electric motors 106 via an electrical circuit (e.g., via copper wiring) comprising one or more first motor status contacts 130. In various embodiments, the one or more first motor status contacts 130 can be normally open electrical contacts coupled to the one or more electric motors 106. For instance, in a de-energized state, the first motor status contact 130 can have an open condition, which does not enable the flow of electrical current. When energized, the first motor status contact 130 can be in a closed condition, which does enable the flow of electrical current.

When power is not being applied to the one or more electric motors 106, the one or more electric motors 106 can be in an OFF condition (e.g., the one or more electric motors 106 are inactive). While the one or more electric motors 106 are in the OFF condition, the first motor status contact 130 can be in the open condition, inhibiting the flow of electrical current to the first port 118a of the controller 112. In contrast, when power is being applied to the one or more electric motors 106, the one or more electric motors 106 can be in an ON condition (e.g., the one or more electric motors 106 are active). While the one or more electric motors 106 are in the ON condition, the first motor status contact 130 can be energized by the one or more electric motors 106 and transitioned to the closed condition, thereby enabling the flow of electrical current to the first port 118a of the controller 112. Thus, the first motor status contact 130 can facilitate the supply of a first digital input signal to the first port 118a of the controller 112, which is indicative of the operating state of the one or more electric motors 106 (e.g., indicative that the one or more electric motors 106 are in the ON condition). In various embodiments, the controller 112 can translate the first digital input signal, or lack thereof, at the first port 118a into the motor status signal 113, which is indicative of whether the one or more electrical motors 106 are in the ON condition or the OFF condition. For instance, the motor status signal 113 can be indicative of an ON condition for the one or more electric motors 106 based on the presence of the first digital input signal at the first port 118a. Additionally, the motor status signal 113 can be indicative of an OFF condition for the one or more electric motors 106 based on a lack of the first digital input signal at the first port 118a.

Additionally, the one or more electric motors 106 can be coupled to one or more second motor status contacts 132.

The one or more second motor status contacts 132 can also be normally open electrical contacts. Additionally, the one or more second motor status contacts 132 can be connected to one or more heater relay coils 134, which in turn can be coupled to one or more first heater relay contacts 136. In one or more embodiments, the one or more first heater relay contacts 136 can be normally closed electrical contacts. For instance, in a de-energized state, the first heater relay contact 136 can have a closed condition, which enables the flow of electrical current. When energized, the first heater relay contact 136 can be in an open condition, which does not enable the flow of electrical current.

As shown in FIG. 1, the one or more first heater relay contacts 136 can be positioned within an electrical circuit (e.g., comprising copper wires) that connects the one or more motor space heaters 108 to one or more AC power sources 137. While the one or more electric motors 106 are in the ON condition, the one or more electric motors 106 can energize the one or more second motor status contacts 132; thereby putting the one or more second motor status contacts 132 in the closed condition. While the one or more second motor status contacts 132 are in the closed condition (e.g., are energized), the one or more heater relay coils 134 can be energized from the AC power source 137 through an isolation switch 138. Further, the one or more energized heater relay coils 134 can energize the one or more first heater relay contacts 136; thereby putting the one or more first heater relay contacts 136 in the open condition. While the one or more first heater relay contacts 136 are in the open condition (e.g., are energized) the flow of electrical current between the one or more motor space heaters 108 and the AC power source 137 is inhibited; thereby de-energizing the one or more motor space heaters 108 and/or putting the one or more motor space heaters 108 in the OFF condition (e.g., rendering the one or more motor space heaters 108 inactive).

Additionally, the one or more heater relay coils 134 can be operably coupled to one or more second heater relay contacts 139, which can also be normally closed electrical contacts. In one or more embodiments, the one or more second heater relay contacts 139 can be comprised within an electrical circuit connected (e.g., via electrical wiring, such as copper wiring) to the second port 118b of the one or more controllers 112. While energized, the one or more heater relay coils 134 can also energize the one or more second heater relay contacts 139; thereby putting the one or more second heater relay contacts 139 in the open condition. While the one or more second heater relay contacts 139 are in the open condition, a second digital input signal to the second port 118b can be disrupted.

While the one or more electric motors 106 are in the OFF condition, the one or more second motor status contacts 132 can be de-energized; thereby putting the one or more second motor status contacts 132 in the open condition. While the one or more second motor status contacts 132 are in the open condition (e.g., de-energized), the one or more heater relay coils 134 can also be de-energized. Further, de-energizing the heater relay coils 134 can result in the one or more first heater relay contacts 136 being de-energized; thereby putting the one or more first heater relay contacts 136 in the closed condition. While the one or more first heater relay contacts 136 are in the closed condition (e.g., are de-energized) the flow of electrical current between the one or more motor space heaters 108 and the AC power source 137 is enabled; thereby energizing the one or more motor space heaters 108 (e.g., the one or more motor space heaters 108 are turned to the ON condition). Thus, while the one or more electric motors 106 are in the ON condition, the one or more motor space heaters 108 can be in the OFF condition; and while the one or more electric motors 106 are in the OFF condition, the one or more motor space heaters 108 can be in the ON condition (e.g., the one or more motor space heaters 108 can be active) in accordance with proper operation of the one or more motor space heaters 108.

Moreover, while the one or more heater relay coils 134 are de-energized, the one or more second heater relay contacts 139 can likewise be de-energized; thereby putting the one or more second heater relay contacts 139 in the closed condition. While the one or more second heater relay contacts 139 are in the closed condition, the second digital input signal can be supplied to the second port 118b of the one or more controllers 112. In various embodiments, the controller 112 can translate the second digital input signal, or lack thereof, at the second port 118b into the heater status signal 114, which is indicative of whether the one or more motor space heaters 108 are in the ON condition or the OFF condition. For instance, the heater status signal 114 can be indicative of an ON condition for the one or more motor space heaters 108 based on the presence of the second digital input signal at the second port 118b. Additionally, the heater status signal 114 can be indicative of an OFF condition for the one or more motor space heaters 108 based on a lack of the second digital input signal at second port 118b.

In one or more embodiments, the sensor circuit 102 can comprise one or more ammeters 140 connected in series with the one or more motor space heaters 108. The one or more ammeter can measure the electrical current drawn by the one or more motor space heaters 108 from the AC power source 137. In one or more embodiments, the one or more ammeters 140 can be mounted in proximity to the one or more motor space heaters 108 to facilitate a visual inspection of the operating status of the one or more motor space heaters 108.

In one or more embodiments, the sensor circuit 102 can comprise one or more transducers 142 connected to the one or more third ports 118c of the one or more controllers 112 (e.g., via electrical wiring, such as twisted pair copper wiring). The transducer 142 can measure the electrical current drawn by the one or more motor space heaters 108 from the AC power source 137. Additionally, the transducer 142 can convert the electrical current from amperes to milliamperes (e.g., 4-20 milliamperes), which can be scaled as per the motor space heater 108 wattage. In one or more embodiments, the transducer 142 can be powered by the AC power source 137. In various embodiments, the one or more transducers 142 can supply the electrical current measurements to the one or more controllers 112 as an analog input signal at the one or more third ports 118c. Additionally, the one or more controllers 112 can translate the analog input signal to the drawn current signal 116.

In some embodiments, the operation data 110 (e.g., the motor status signal 113, the heater status signal 114, and/or the drawn current signal 116) can be timestamped by the one or more controllers 112. As used herein, "timestamped" can refer to recording a set of time series measurements indicative of a time period associated with one or more data points. For example, data can be timestamped to indicate a start time, an end time, and/or a time increment associated with the measurement and/or collection of the data. For instance, timestamped data can include dates and/or times indicating the moment of data collection and/or measurement.

In some embodiments, the one or more controllers 112 can include identification ("ID") data 144 in the operation data 110 shared and/or transmitted to the one or more computing devices 122 (e.g., to the data evaluator 104). The ID data 144 can include contextual information associated with the measurement and/or collection of the motor status signal 113, the heater status signal 114, and/or the drawn current signal 116. The ID data 144 can include, but is not limited to: an ID of the one or more electric motors 106 associated with the motor status signal 113 (e.g., identifying the one or more electric motors 106 by make, model, name, and/or location); an ID of the one or more motor space heaters 108 associated with the heater status signal 114 and/or the drawn current signal (e.g., identifying the one or more motor space heaters 108 by make, model, name, and/or location); an ID of the controller 112 generating the operation data 110, a combination thereof, and/or the like.

In one or more embodiments, the one or more controllers 112 can share and/or transmit the operation data 110 to the data evaluator 104 (e.g., via one or more networks 121) continuously and/or in accordance with a defined schedule. For example, the one or more controllers 112 can transmit the operation data 110 to the data evaluator 104 continuously, or near continuously, such that the data evaluator 104 can monitor the operating status of the one or more motor space heaters 108 and/or electric motors 106 in real-time, or near real-time (e.g., less than a minute).

In one or more embodiments, the computing device 122 (e.g., via the data evaluator 104 and/or processing units 124) can store the operation data 110 in one or more historic databases 128. For example, the operation data 110 can be stored in one or more historic databases 128 within the computer readable storage media 126 of the one or more computing devices 122 (e.g. as shown in FIG. 1). In another example, the one or more historic databases 128 can be central data repositories remotely accessible by the one or more computing devices 122, the data evaluator 104, and/or the one or more controllers 112.

In various embodiments, a computing device 122 and/or a data evaluator 104 can be operably coupled to multiple sensor circuits 102. For example, a single data evaluator 104 can analyze multiple sets of operation data 110, with each set being generated by a respective sensor circuit 102 regarding the operating status and/or functionality of a respective motor space heater 108. For instance, a first sensor circuit 102 can generate a first set of operation data 110 characterizing the operating status and/or functionality of a first motor space heater 108 (e.g., associated with a first electric motor 106). Likewise, a second sensor circuit 102 can generate a second set of operation data 110 characterizing the operating status and/or functionality of a second motor space heater 108 (e.g., associated with a second electric motor 106). Both the first sensor circuit 102 and the second sensor circuit 102 can share the respective sets of operation data 110 with a common data evaluator 104; thereby the data evaluator 104 can simultaneously monitor both the first motor space heater 108 and the second motor space heater 108.

Figure 2:
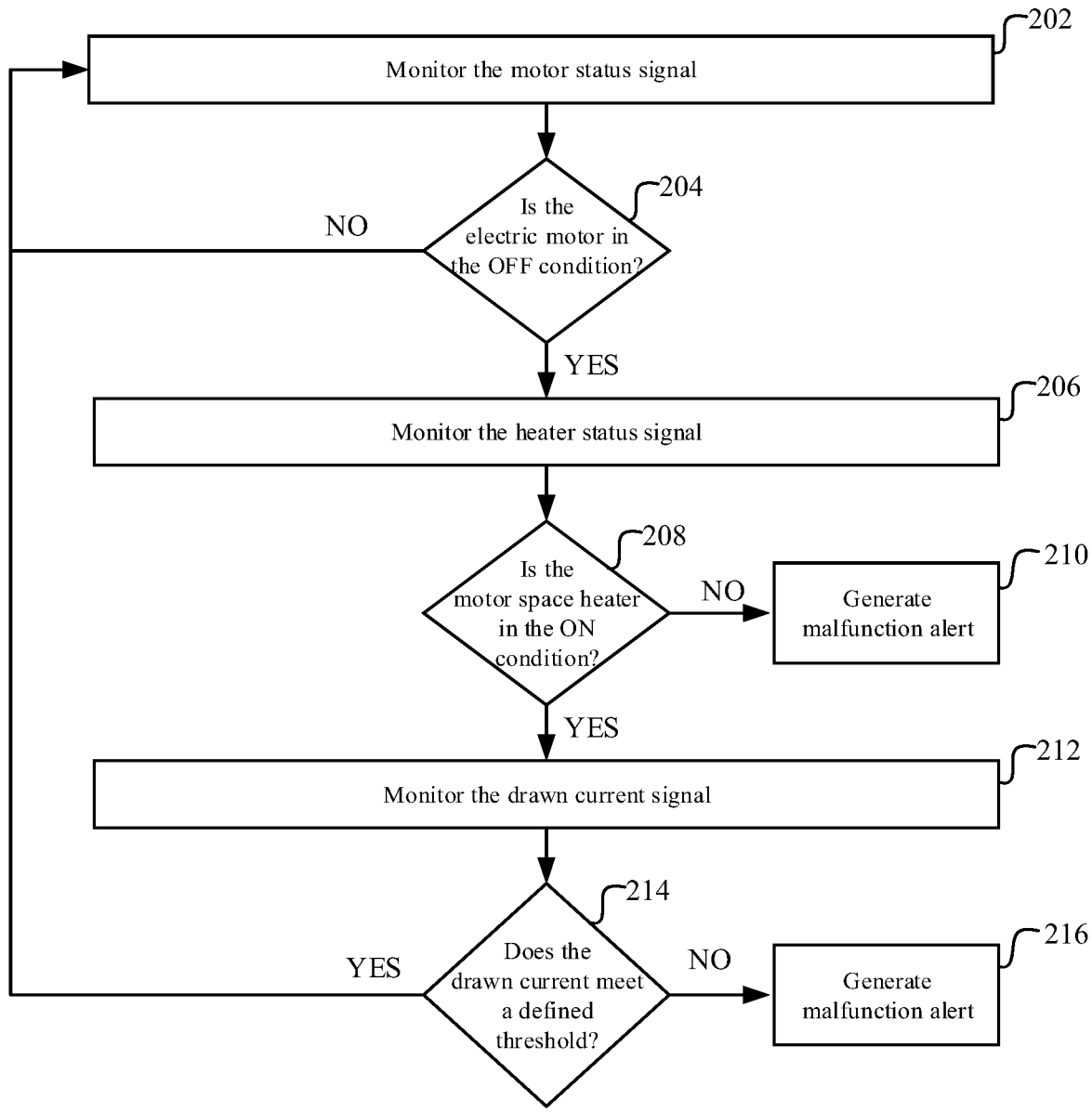
FIG. 2 is a flow diagram of a non-limiting example method that can be implemented by one or more systems to monitor the operating status and/or functionality of one or more motor space heaters in accordance with one or more embodiments described herein.

In view of the foregoing structural and functional features described above, example methods will be better appreciated with reference to FIG. 2. While, for purposes of simplicity of explanation, the example method of FIG. 2 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

FIG. 2 illustrates a diagram of a non-limiting example method 200 that can be implemented by the data evaluator 104 to monitor the one or more motor space heaters 108 in accordance with one or more embodiments described herein. In various embodiments, the data evaluator 104 can employ the method 200 to analyze the motor status signal 113, the heater status signal 114, and/or the drawn current signal 116 of the operation data 110. For example, the data evaluator 104 can employ method 200 to analyze operation data 110 transmitted from the one or more controllers 112. In another example, the data evaluator 104 can employ method 200 to analyze operation data 110 stored in one or more historic databases 128 (e.g., one or more central data repositories).

At 202, the method 200 can comprise monitoring (e.g., via the one or more networks 121, processing units 124, and/or data evaluator 104) the motor status signal 113. In accordance with various embodiments, the motor status signal 113 can be comprised within the operation data 110 transmitted by the one or more controllers 112. Further, the motor status signal 113 can indicate whether one or more associate electric motors 106 are in the ON condition or the OFF condition for a given time period.

At 204, the method 200 can comprise determining (e.g. via the data evaluator 104 and/or processing units 124) whether the one or more electric motors 106 are in the OFF condition based on the motor status signal 113. For example, the motor status signal 113 can exhibit a high amplitude during periods of time when the one or more electric motors 106 are in the ON condition. Also, the motor status signal 113 can exhibit a low amplitude during periods of time when the one or more electric motors 106 are in the OFF condition.

Where the motor status signal 113 indicates that the one or more electric motors 106 are not in the OFF condition (i.e., that the one or more electric motors 106 are in the ON condition); the method 200 can proceed back to 202, and the data evaluator 104 can continue to monitor the motor status signal 113. Where the motor status signal 113 indicates that the one or more electric motors 106 are in the OFF condition, the method 200 can proceed to 206. Thereby, the method 200 can detect (e.g., via the one or more processing units 124, and/or data evaluator 104) whether the one or more electric motors 106 are inactive (e.g., turned off and/or achieving an OFF condition).

At 206, the method 200 can comprise monitoring (e.g., via the one or more networks 121, processing units 124, and/or data evaluator 104) the heater status signal 114. In accordance with various embodiments, the heater status signal 114 can be comprised within the operation data 110 transmitted by the one or more controllers 112. Further, the heater status signal 114 can indicate whether one or more associate motor space heaters 108 are in the ON condition or the OFF condition for a given time period.

At 208, the method 200 can comprise determining (e.g. via the data evaluator 104 and/or processing units 124) whether the one or more motor space heaters 108 are in the ON condition based on the heater status signal 114. For example, the heater status signal 114 can exhibit a high amplitude during periods of time when the one or more motor space heaters 108 are in the ON condition. Also, the heater status signal 114 can exhibit a low amplitude during periods of time when the one or more motor space heaters 108 are in the OFF condition. Where the heater status signal 114 indicates that the one or more motor space heaters 108 are not in the ON condition (i.e., that the one or more motor space heaters 108 are in the OFF condition), the method 200 can proceed to 210. Thereby, the system 100 (e.g., via the one or more processing units 124 and/or data evaluators 104) can detect one or more malfunctions in the operating status of the one or more motor space heaters 108 based on the determination at 208.

At 210, the method 200 can comprise generating (e.g., via the one or more processing units 124 and/or data evaluator 104) one or more malfunction alerts regarding the operating status of the one or more motor space heaters 108. For example, a determination that the one or more motor space heaters 108 are in the OFF condition at 208 can be indicative that the one or more motor space heaters 108 are malfunctioning (e.g., have experienced a failure to operate). For instance, since the one or more electric motors 106 have been determined to be in the OFF condition; the one or more motor space heaters 108 should be in the ON condition, if working properly.

The malfunction alert generated at 210 can indicate that the one or more motor space heaters 108 are experiencing a malfunction (e.g., a failure to operate). Additionally, the malfunction alert can include contextual data (e.g., including timestamped data and/or ID data 144 included in the operation data 110) regarding the detected malfunction, including, but not limited to: identification data describing the particular motor space heater 108 identified as malfunctioning, the date and/or time of the malfunction detection, the date and/or time of the malfunction itself, a combination thereof, and/or the like. Further, the malfunction alert can be shared with one or more users of the system 100 (e.g., via one or more networks 121 and/or computing devices 122).

Where the heater status signal 114 indicates that the one or more motor space heaters 108 are in the ON condition, the method 200 can proceed to 212. At 212, the method 200 can comprise monitoring (e.g., via the one or more networks 121, processing units 124, and/or data evaluator 104) the drawn current signal 116. In accordance with various embodiments, the drawn current signal 116 can be comprised within the operation data 110 transmitted by the one or more controllers 112. Further, the drawn current signal 116 can indicate whether one or more associate motor space heaters 108 are drawing the appropriate level of electrical current from the AC power source 137. For example, the drawn current signal 116 can include one or more measurements of current drawn by the one or more motor space heaters 108 during the given time period.

At 214, the method 200 can comprise determining (e.g. via the data evaluator 104 and/or processing units 124) whether the one or more motor space heaters 108 are drawing an electrical current from the one or more AC power sources 137 in accordance with one or more defined thresholds. In various embodiments, the one or more thresholds can be predefined and/or can be indicative of proper operation of the one or more motor space heaters 108. For example, the one or more thresholds can define a minimum current level threshold value, below which is indicative of a malfunction of the one or more motor space heaters 108. In another example, the one or more thresholds can define a permissible current level range, outside of which is indicative of the malfunction. Further, in one or more embodiments, a set of threshold values can be defined, with respective threshold values and/or ranges associated with different operating statuses of the one or more motor space heaters 108 (e.g., threshold values associated with the one or more motor space heaters 108 in the ON condition, and/or threshold values associated with one or more motor space heaters 108 in the OFF condition). In some embodiments, a permissible current level range defined by the one or more defined threshold value (e.g., associated with the one or more motor space heaters 108 functioning properly when in the ON condition) can be from, for example, great than or equal to zero and less than or equal to +/−ten percent of manufacturer current rating of the motor space heater 108. In one or more embodiments, the permissible current level can be based on the type and/or model of the motor space heater 108 assembly Where the drawn current signal 116 indicates that the electrical current drawn by the one or more motor space heaters 108 meets the one or more defined thresholds, the method 200 can proceed to 202 and the data evaluator 104 can continue to monitor the motor status signal 113. For example, a determination of YES at 214 can be indicative that the one or more motor space heaters 108 are operating at the appropriate time and to the desired standard of functionality.

Where the drawn current signal 116 indicates that the electrical current drawn by the one or more motor space heaters 108 fails to meet the one or more defined thresholds, the method 200 can proceed to 216. At 216, the method 200 can comprise generating (e.g., via the one or more processing units 124 and/or data evaluator 104) one or more malfunction alerts regarding the function of the one or more motor space heaters 108. For example, a determination that the drawn electrical current is non-compliant with the one or more defined thresholds at 214 can be indicative that the one or more motor space heaters 108 are malfunctioning (e.g., have experienced a partial failure). Thereby, the system 100 (e.g., via the one or more processing units 124 and/or data evaluators 104) can detect one or more malfunctions in the functionality of the one or more motor space heaters 108 based on the determination at 214.

The malfunction alert generated at 216 can indicate that the one or more motor space heaters 108 are experiencing a malfunction (e.g., a partial failure; where the one or more motor space heaters 108 are in the ON condition, but fully functional). Additionally, the malfunction alert can include contextual data (e.g., including timestamped data and/or ID data 144 included in the operation data 110) regarding the detected malfunction, including, but not limited to: identification data describing the particular motor space heater 108 identified as malfunctioning, the date and/or time of the malfunction detection, the date and/or time of the malfunction itself, a combination thereof, and/or the like. Further, the malfunction alert can be shared with one or more users of the system 100 (e.g., via one or more networks 121 and/or computing devices 122).

While FIG. 2 depicts an exemplary embodiment in which the method 200 only generates notifications (e.g. malfunction alerts) in response to detected malfunctions, the architecture of the method 200 and/or the system 100 is not so limited. For example, embodiments in which the data evaluator 104 generates notifications describing proper operating status and/or functionality of the one or more motor space heaters 108 (e.g., based on the determinations at 208 and/or 214) are also envisaged. Further, in various embodiments, the system 100 (e.g., via the one or more processing units 124 and/or data evaluators 104) can execute multiple iterations of method 200 to continuously track the operating status and/or functionality of the one or more motor space heaters 108. Additionally, in one or more embodiments, a single data evaluator 104 can simultaneously implement multiple instances of method 200 to concurrently monitor multiple motor space heaters 108 (e.g., via multiple sensor circuits 102).

Figure 3:
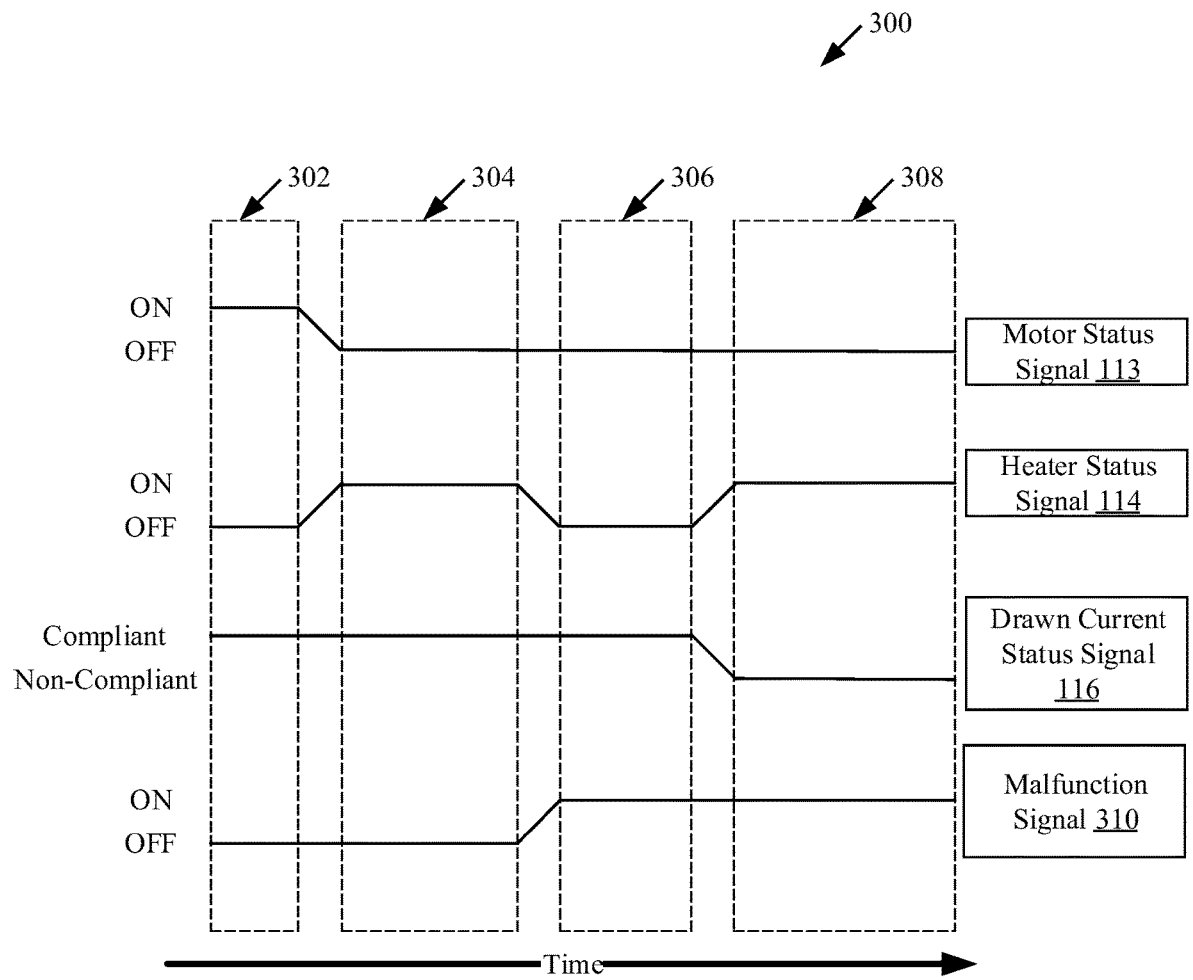
FIG. 3 is a diagram of a non-limiting monitoring scheme that can be achieved by one or more systems that are monitoring the operating status and/or functionality of one or more motor space heaters in accordance with one or more embodiments described herein.

FIG. 3 illustrates a diagram of a non-limiting example monitoring scheme 300 that can be achieved by the data evaluator 103 when analyzing (e.g., via method 200) the operation data 110 from the sensor circuit 102 in accordance with one or more embodiments described herein. The example monitoring scheme 300 can represent a monitoring of the one or more motor space heaters 108 over four periods of time: a first period of time 302, a second period of time 304, a third period of time 306, and/or a fourth period of time 308. The malfunction signal 310 can be indicative of whether the data evaluator 104 detects a malfunction and/or generates one or more malfunction alerts regarding the detected malfunction. In accordance with various embodiments described herein, the example monitoring scheme 300 can exemplify how the system 100 (e.g., via the one or more sensor circuits 102, processing units 124, and/or data evaluators 104) can implement multiple iterations of method 200 to continuously monitor the one or more motor space heaters 108 and/or track the operating status and/or functionality of the one or more motor space heaters 108 in relation to the operating status of the one or more electric motors 106 over a defined period of time.

As shown in FIG. 3, the operation data 110 and/or the malfunction signal 310 can be represented as lines extending through each of the four periods of time. Additionally, the height of each line can vary between a high amplitude (e.g., corresponding to the ON condition or a compliance with the one or more defined thresholds) and a low amplitude (e.g., corresponding to the OFF condition or a non-compliance with the one or more defined thresholds).

During the first period of time 302 in the example monitoring scheme 300: the motor status signal 113 indicates that the one or more electric motors 106 are in the ON condition; the heater status signal 114 indicates that the one or more motor space heaters 108 are in the OFF condition; and the drawn current status signal 116 measures electrical current values that are compliant (e.g. that meet) the one or more defined thresholds describing standard operating behavior for the one or more motor space heaters 108 (e.g., given the operating status of the one or more motor space heaters 108). Therefore, the data evaluator 104 can determine that the one or more motor space heaters 108 are fully operational; and the data evaluator 104 can refrain from generating a malfunction alert, as indicated by the malfunction signal 310 corresponding to the OFF condition.

During the second period of time 304 in the example monitoring scheme 300: the motor status signal 113 indicates that the one or more electric motors 106 are in the OFF condition; the heater status signal 114 indicates that the one or more motor space heaters 108 are in the ON condition; and the drawn current status signal 116 measures electrical current values that are compliant (e.g. that meet) the one or more defined thresholds describing standard operating behavior for the one or more motor space heaters 108 (e.g., given the operating status of the one or more motor space heaters 108). Therefore, the data evaluator 104 can determine that the one or more motor space heaters 108 are fully operational; and the data evaluator 104 can refrain from generating a malfunction alert, as indicated by the malfunction signal 310 corresponding to the OFF condition.

During the third period of time 306 in the example monitoring scheme 300: the motor status signal 113 indicates that the one or more electric motors 106 are in the OFF condition; the heater status signal 114 indicates that the one or more motor space heaters 108 are in the OFF condition; and the drawn current status signal 116 measures electrical current values that are compliant (e.g. that meet) the one or more defined thresholds describing standard operating behavior for the one or more motor space heaters 108 (e.g., given the operating status of the one or more motor space heaters 108). Therefore, the data evaluator 104 can determine that the one or more motor space heaters 108 are malfunctioning. For example, during proper operation, the one or more motor space heaters 108 would be in the ON condition while the one or more electric motors 106 are in the OFF condition in accordance with various embodiments described herein. Thus, the data evaluator 104 can generate a malfunction alert indicating that the one or more motor space heaters 108 have experienced a malfunction (e.g., have failed to operate) during the third period of time 306, as indicated by the malfunction signal 310 corresponding to the ON condition.

During the fourth period of time 308 in the example monitoring scheme 300: the motor status signal 113 indicates that the one or more electric motors 106 are in the OFF condition; the heater status signal 114 indicates that the one or more motor space heaters 108 are in the ON condition; and the drawn current status signal 116 measures electrical current values that are non-compliant (e.g., that fail to meet) the one or more defined thresholds describing standard operating behavior for the one or more motor space heaters 108 (e.g., given the operating status of the one or more motor space heaters 108). Therefore, the data evaluator 104 can determine that the one or more motor space heaters 108 are malfunctioning. For example, during proper operation, the one or more motor space heaters 108 would be drawing electrical current from the one or more AC power sources 137 in compliance with the one or more defined thresholds. Thus, the data evaluator 104 can generate a malfunction alert indicating that the one or more motor space heaters 108 have experienced a malfunction (e.g., have experienced a partial failure, where the functionality of the one or more motor space heaters 108 is impaired) during the fourth period of time 308, as indicated by the malfunction signal 310 corresponding to the ON condition.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 4. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 4:
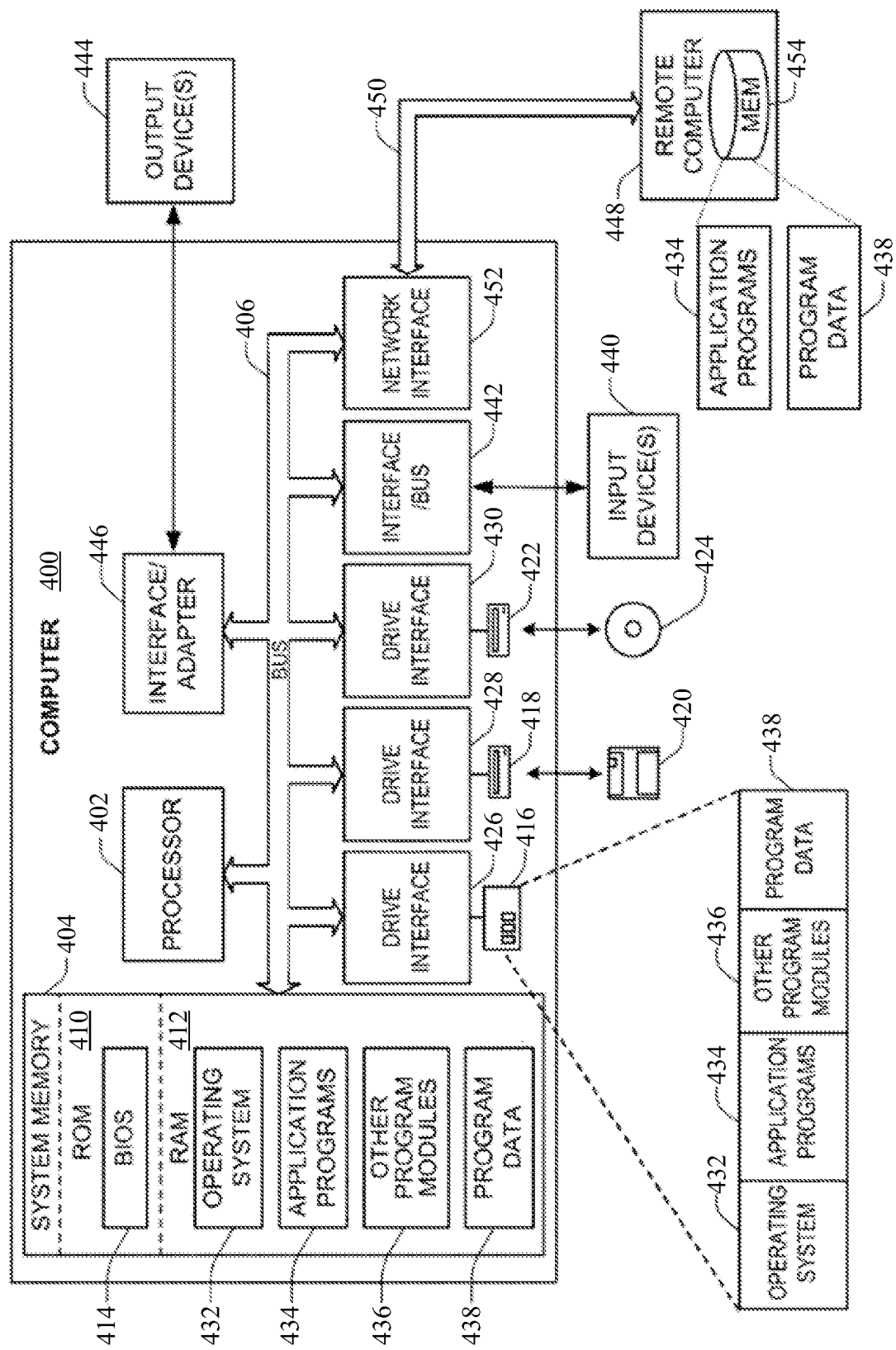
FIG. 4 illustrates a block diagram of non-limiting example computer environment that can be implemented within one or more systems described herein.

In this regard, FIG. 4 illustrates one example of a computer system 400 that can be employed to execute one or more embodiments of the present disclosure. Computer system 400 can be implemented on one or more general purpose networked computer systems, embedded computer systems, routers, switches, server devices, client devices, various intermediate devices/nodes or standalone computer systems, Additionally, computer system 400 can be implemented on various mobile clients such as, for example, a personal digital assistant (PDA), laptop computer, pager, and the like, provided it includes sufficient processing capabilities.

Computer system 400 includes processing unit 402, system memory 404, and system bus 406 that couples various system components, including the system memory 404, to processing unit 402. Dual microprocessors and other multi-processor architectures also can be used as processing unit 402. System bus 406 may be any of several types of bus structure including a memory bus or memory controller, a peripheral bus, and a local bus using any of a variety of bus architectures. System memory 404 includes read only memory (ROM) 410 and random access memory (RAM) 412. A basic input/output system (BIOS) 414 can reside in ROM 410 containing the basic routines that help to transfer information among elements within computer system 400.

Computer system 400 can include a hard disk drive 416, magnetic disk drive 418, e.g., to read from or write to removable disk 420, and an optical disk drive 422, e.g., for reading CD-ROM disk 424 or to read from or write to other optical media. Hard disk drive 416, magnetic disk drive 418, and optical disk drive 422 are connected to system bus 406 by a hard disk drive interface 426, a magnetic disk drive interface 428, and an optical drive interface 430, respectively. The drives and associated computer-readable media provide nonvolatile storage of data, data structures, and computer-executable instructions for computer system 400. Although the description of computer-readable media above refers to a hard disk, a removable magnetic disk and a CD, other types of media that are readable, by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 410, including operating system 432, one or more application programs 434, other program modules 436, and program data 438. In some examples, the application programs 434 can include the data evaluator 104, and the program data 438 can include the operation data 110 historic database 128, and/or one or more of the defined threshold values described herein. The application programs 434 and program data 438 can include functions and methods programmed to monitor (e.g., continuously monitor) the operating status and/or functionality of one or more motor space heaters 108, such as shown and described herein.

A user may enter commands and information into computer system 400 through one or more input devices 440, such as a pointing device (e.g., a mouse, touch screen), keyboard, microphone, joystick, game pad, scanner, and the like. For instance, the user can employ input device 440 to edit or modify the one or more defined threshold values and/or review the one or more generated notification (e.g., malfunction alerts), These and other input devices 440 are often connected to processing unit 402 through a corresponding port interface 442 that is coupled to the system bus, but may be connected by other interfaces, such as a parallel port, serial port, or universal serial bus (USB). One or more output devices 444 (e.g., display, a monitor, printer, projector, or other type of displaying device) is also connected to system bus 406 via interface 446, such as a video adapter.

Computer system 400 may operate in a networked environment using logical connections to one or more remote computers, such as remote computer 448. Remote computer 448 may be a workstation, computer system, router, peer device, or other common network node, and typically includes many or all the elements described relative to computer system 400. The logical connections, schematically indicated at 450, can include a local area network (LAN) and a wide area network (WAN). When used in a LAN networking environment, computer system 400 can be connected to the local network through a network interface or adapter 452. When used in a WAN networking environment, computer system 400 can include a modem, or can be connected to a communications server on the LAN. The modem, which may be internal or external, can be connected to system bus 406 via an appropriate port interface. In a networked environment, application programs 434 or program data 438 depicted relative to computer system 400, or portions thereof, may be stored in a remote memory storage device 454.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method, comprising:
    detecting that an electric motor is inactive based on operation data generated by a sensor circuit coupled to the electric motor;
    determining, in response to the detecting, whether a motor space heater in proximity to the electric motor is active based on the operation data, wherein the sensor circuit is further coupled to the motor space heater; and
    activating the motor space heater if the electric motor is detected to be inactive.

2. The method of claim 1, further comprising:
    detecting a malfunction in an operating status of the motor space heater based on a determination that the motor space heater is inactive while the electric motor is inactive; and
    generating a malfunction alert that characterizes the malfunction.

3. The method of claim 1, further comprising:
    comparing a measurement of electrical current drawn from the motor space heater from a power source to a defined threshold value in response to a determination that the motor space heater is active.

4. The method of claim 3, further comprising:
    detecting a malfunction in a functionality of the motor space heater based on a determination that the measurement of the electrical current drawn from the motor space heater is non-compliant with the defined threshold value.

5. The method of claim 1, wherein the sensor circuit continuously monitors an operating status of the motor space heater.

6. The method of claim 1, further comprising:
    tracking an operating status and a functionality of the motor space heater in relation to an operating status of the electric motor over a defined period of time.

7. A system, comprising:
    a sensor circuit coupled to an electric motor and a motor space heater, wherein the sensor circuit generates operation data characterizing the operating status of the electric motor;
    a data evaluator configured to monitor the operation data to determine whether the motor space heater is active in response to the operation data indicating that the electric motor is inactive; and
    a controller to activate the motor space heater if the electric motor is detected to be inactive.

8. The system of claim 7, further comprising:
    a memory to store computer executable instructions; and
    one or more processors, operatively coupled to the memory, that execute the computer executable instructions to implement the data evaluator.

9. The system of claim 7, wherein the data evaluator is further configured to generate a malfunction alert based on a determination that the motor space heater is inactive while the electric motor is inactive.

10. The system of claim 7, wherein the sensor circuit comprises a controller that is configured to receive a first electrical signal that is indicative that the electric motor is active.

11. The system of claim 10, wherein the controller is further configured to receive a second electrical signal that is indicative that the motor space heater is active.

12. The system of claim 11, wherein the controller is further configured to receive a third electrical signal that characterizes a measurement of electrical current drawn from the motor space heater from a power source.

13. The system of claim 12, wherein the sensor circuit generates the operation data based on the first electrical signal, the second electrical signal, and the third electrical signal.

14. The system of claim 13, wherein the data evaluator is further configured to compare the measurement of the electrical current drawn from the motor space heater to a defined threshold value in response to a determination that the motor space heater is active.

15. The system of claim 14, wherein the data evaluator is further configured to generate a malfunction alert based on a determination that the measurement of the electrical current drawn from the motor space heater is non-compliant with the defined threshold value.

* * * * *